United States Patent
Nochi et al.

(10) Patent No.: US 9,272,265 B2
(45) Date of Patent: *Mar. 1, 2016

(54) METHOD FOR SUPPRESSING INCREASE IN $SO_2$ OXIDATION RATE OF $NO_x$ REMOVAL CATALYST

(75) Inventors: Katsumi Nochi, Minato-ku (JP); Masashi Kiyosawa, Minato-ku (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 14/342,862

(22) PCT Filed: Sep. 5, 2012

(86) PCT No.: PCT/JP2012/072622
§ 371 (c)(1),
(2), (4) Date: Mar. 5, 2014

(87) PCT Pub. No.: WO2013/035743
PCT Pub. Date: Mar. 14, 2013

(65) Prior Publication Data
US 2014/0213429 A1    Jul. 31, 2014

(30) Foreign Application Priority Data
Sep. 9, 2011    (JP) .................. 2011-197361

(51) Int. Cl.
*B01J 21/20*    (2006.01)
*B01J 38/64*    (2006.01)
(Continued)

(52) U.S. Cl.
CPC .............. *B01J 21/20* (2013.01); *B01D 53/8625* (2013.01); *B01D 53/96* (2013.01); *B01J 21/063* (2013.01);
(Continued)

(58) Field of Classification Search
CPC .......... B01J 38/64; B01J 38/60; B01J 21/063; B01J 21/08; B01J 21/20; B01J 37/06; B01J 37/0036; B01J 37/0215; B01J 23/30; B01D 53/8625; B01D 53/96
USPC ....................................................... 502/20–56
See application file for complete search history.

(56) References Cited

U.S. PATENT DOCUMENTS 6,232,254 B1    5/2001    Schneider et al.
6,241,826 B1    6/2001    Dittmer et al.
(Continued)

FOREIGN PATENT DOCUMENTS

CA    2 268 039    1/2000
EP    0 353 467    2/1990
(Continued)

OTHER PUBLICATIONS

Translation of International Preliminary Report on Patentability issued Nov. 1, 2013, in International Application No. PCT/JP2012/072622.

(Continued)

*Primary Examiner* — Jennifer A Smith
(74) *Attorney, Agent, or Firm* — Wenderoth, Lind & Ponack, L.L.P.

(57) ABSTRACT

In a $NO_x$ removal catalyst used for removing nitrogen oxides in flue gas, when a silica (Si) component as an inhibitor that causes an increase in a $SO_2$ oxidation rate accumulates on a surface of the catalyst, the silica component accumulating on the surface of the catalyst is dissolved, thereby regenerating the catalyst. Accordingly, the inhibitor such as the silica component covering the surface of the $NO_x$ removal catalyst can be removed, thereby enabling to provide a catalyst without having an increase in the $SO_2$ oxidation rate of the regenerated $NO_x$ removal catalyst.

6 Claims, 1 Drawing Sheet

(51) Int. Cl.
*B01D 53/96* (2006.01)
*B01J 37/06* (2006.01)
*B01J 38/60* (2006.01)
*B01J 23/30* (2006.01)
*B01J 37/00* (2006.01)
*B01J 37/02* (2006.01)
*B01J 21/06* (2006.01)
*B01J 21/08* (2006.01)
*B01D 53/86* (2006.01)

(52) U.S. Cl.
CPC *B01J 21/08* (2013.01); *B01J 23/30* (2013.01); *B01J 37/0036* (2013.01); *B01J 37/0215* (2013.01); *B01J 37/06* (2013.01); *B01J 38/60* (2013.01); *B01J 38/64* (2013.01); *B01D 2255/20707* (2013.01); *B01D 2255/20723* (2013.01); *B01D 2255/20769* (2013.01); *B01D 2255/20776* (2013.01)

(56) References Cited

U.S. PATENT DOCUMENTS

| | | | | |
|---|---|---|---|---|
| 8,722,559 | B2 * | 5/2014 | Nochi et al. | 502/56 |
| 2006/0135347 | A1 * | 6/2006 | Schluttig et al. | 502/25 |

FOREIGN PATENT DOCUMENTS

| | | |
|---|---|---|
| EP | 1 946 838 | 7/2008 |
| JP | 60-38037 | 2/1985 |
| JP | 62-241555 | 10/1987 |
| JP | 63-1429 | 1/1988 |
| JP | 2-293051 | 12/1990 |
| JP | 7-508929 | 10/1995 |
| JP | 8-196904 | 8/1996 |
| JP | 10-5547 | 1/1998 |
| JP | 10-235209 | 9/1998 |
| JP | 2000-37634 | 2/2000 |
| JP | 3059136 | 4/2000 |
| JP | 3059137 | 4/2000 |
| JP | 3224708 | 8/2001 |
| JP | 2001-340764 | 12/2001 |
| JP | 3297305 | 7/2002 |
| JP | 3377715 | 2/2003 |
| JP | 2005-74408 | 3/2005 |
| JP | 2005-126317 | 5/2005 |
| JP | 2007-14960 | 1/2007 |
| JP | 2007-330856 | 12/2007 |
| JP | 4436124 | 1/2010 |
| JP | 4429171 | 3/2010 |
| WO | 2004/043575 | 5/2004 |

OTHER PUBLICATIONS

Office Action issued Oct. 21, 2014 in corresponding Japanese Application No. 2011-197361 with English translation.
Notice of Allowance issued Jan. 20, 2015 in corresponding Japanese Application No. JP 2011-197361, with English translation.
Office Action issued Feb. 25, 2015 in corresponding Chinese Application No. 201280042765.0, with English translation.
Notice of Allowance issued May 7, 2015 in corresponding Taiwanese Application No. 101132735, with English translation.
International Search Report issued Oct. 30, 2012 in International (PCT) Application No. PCT/JP2012/072622.
Written Opinion of the International Searching Authority issued Oct. 30, 2012 in International (PCT) Application No. PCT/JP2012/072622.
Examiner's Report for Canadian Application issued Jun. 25, 2015 in corresponding Canadian Application No. 2,847,671.

* cited by examiner

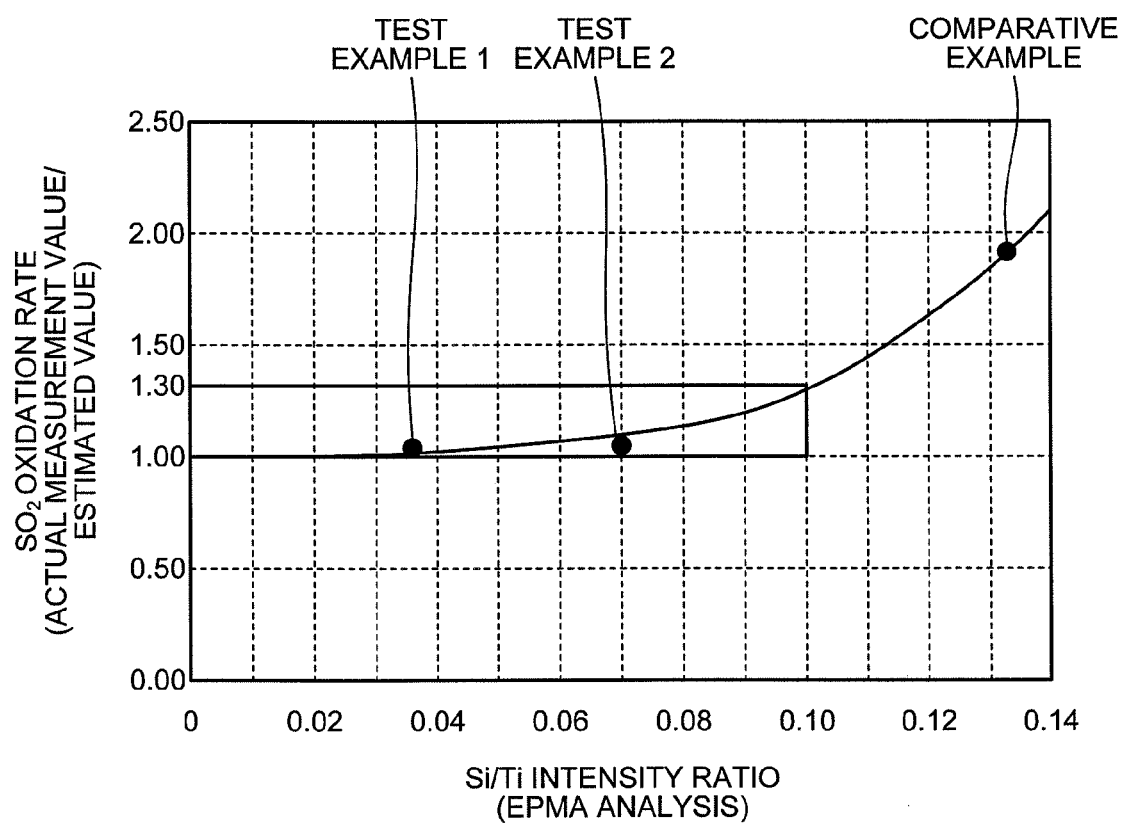

METHOD FOR SUPPRESSING INCREASE IN SO₂ OXIDATION RATE OF NO$_x$ REMOVAL CATALYST

FIELD

The present invention relates to a method for suppressing an increase in a $SO_2$ oxidation rate of a $NO_x$ removal catalyst.

BACKGROUND

In recent years, from a viewpoint of preventing air pollution, an ammonia catalytic reduction method in which ammonia is used as a reducing agent to catalytically decompose nitrogen oxides (hereinafter, referred to as $NO_x$) into nitrogen and water by a catalyst has been widely used as a method of removing $NO_x$ produced from a boiler or various combustion furnaces. As the $NO_x$ removal catalyst, which has been currently put into practical use, a honeycomb catalyst having a rectangular hole shape has been the mainstream, in order to prevent blockages due to dust in flue gas and to widen a gas contact area. Furthermore, as a catalyst component, a type of catalyst component containing titanium oxide as a main component is excellent, and one containing vanadium, tungsten or the like as an active component is generally used, and a binary $TiO_2$-$WO_3$ catalyst or $TiO_2$-$MoO_3$ catalyst, a ternary $TiO_2$-$V_2O_5$-$WO_3$ catalyst or $TiO_2$-$V_2O_5$-$MoO_3$ catalyst and the like are mainly used.

In flue gas discharged from a coal combustion boiler, a calcium content contained in dust in flue gas mainly adheres to a surface of the catalyst to produce anhydrous calcium sulfate contained in flue gas and cover the surface of the catalyst, thereby blocking diffusion of NO and $NH_3$ gas to the inside of the catalyst and deteriorating the performance of the catalyst. Conventionally, at the time of regeneration of a catalyst, whose performance is deteriorated due to these causes of deterioration, washing with water and an aqueous solution of hydrochloric acid has been known to be effective.

Furthermore, there has been proposed a technique for performing activation treatment of a catalyst with an acidic aqueous solution after removing a substance accumulated on the catalyst by washing it with an aqueous alkaline solution, at the time of the regeneration of a $NO_x$ removal catalyst whose $NO_x$ removal performance deteriorates due to accumulation of arsenic ($As_2O_3$) present in flue gas, (Patent Literature 1).

CITATION LIST

Patent Literature

Patent Literature 1: Japanese Laid-open Patent Publication No. 2000-037634

SUMMARY

Technical Problem

The present inventors have confirmed that a regeneration effect of a $SO_2$ oxidation rate can be hardly exhibited in a conventional washing step, in the course of performing regeneration tests of a $NO_x$ removal catalyst used for flue gas from a coal combustion boiler. Particularly, for example, when the $NO_x$ removal catalyst regenerated by the method described above is impregnated or coated with a catalytically active component containing vanadium or the like, there is a problem that the $SO_2$ oxidation rate is increased.

As a result of examinations on this cause, it has been found that the problem is caused by the presence of silica adhered to the $NO_x$ removal catalyst.

In conventional boiler combustion, its air to fuel ratio is high, and the combustion is performed in a large boiler facility having a sufficient furnace volume, and thus complete combustion of coal as a fuel has been ensured. However, in a recent boiler, because its air ratio is low and combustion is performed in a small boiler facility, combustion is performed under conditions closer to a reduction atmosphere than before, and thus unburned coal is increased, and obstructive factors such as silica present in a form of high-temperature steam in the unburned coal cover the surface of the $NO_x$ removal catalyst and regeneration treatment of the $NO_x$ removal catalyst cannot be performed favorably.

As a result, even when a regeneration step is performed on the $NO_x$ removal catalyst, there is a problem that regeneration is not performed favorably, thereby causing an increase in the $SO_2$ oxidation rate of the $NO_x$ removal catalyst.

In consideration of the above problem, an object of the present invention is to provide a method for suppressing an increase in a $SO_2$ oxidation rate of a $NO_x$ removal catalyst, which removes obstructive factors such as a silicon compound such as silica adhered to the $NO_x$ removal catalyst.

Solution to Problem

According to a first aspect of the present invention in order to solve the above problem, there is provided a method for suppressing an increase in a $SO_2$ oxidation rate of a $NO_x$ removal catalyst, including: an alkali treatment step at which an inhibitor, which causes an increase in a $SO_2$ oxidation rate, is removed by washing with an aqueous alkaline solution, at a time of regeneration of the $NO_x$ removal catalyst; and an activation treatment step at which activation treatment of the catalyst is performed with an acidic aqueous solution, after the alkali treatment step.

According to a second aspect of the present invention, there is provided the method for suppressing an increase in a $SO_2$ oxidation rate of a $NO_x$ removal catalyst according to the first aspect, wherein a carrier of the $NO_x$ removal catalyst is titanium oxide, and the inhibitor is a silicon compound, an intensity ratio of titanium and silicon (Si/Ti intensity ratio) on a surface of the $NO_x$ removal catalyst is obtained, and when the Si/Ti intensity ratio exceeds a predetermined threshold, the alkali treatment step and the activation treatment step are performed again.

According to a third aspect of the present invention, there is provided the method for suppressing an increase in a $SO_2$ oxidation rate of a $NO_x$ removal catalyst according to the second aspect, wherein a measurement of the intensity ratio of titanium and silicon is performed by an electron probe microanalyzer (EPMA).

According to a fourth aspect of the present invention, there is provided the method for suppressing an increase in a $SO_2$ oxidation rate of a $NO_x$ removal catalyst according to the first or second aspect, wherein the aqueous alkaline solution is an aqueous solution of NaOH, KOH, $Na_2CO_3$, $NaHCO_3$ or $K_2CO_3$, and the acidic aqueous solution is an aqueous solution of HCl, $HNO_3$, HF or $H_2SO_4$.

According to a fifth aspect of the present invention, there is provided the method for suppressing an increase in a $SO_2$ oxidation rate of a $NO_x$ removal catalyst according to the first or second aspect, wherein after washing the $NO_x$ removal catalyst, a catalytically active component is impregnated and supported in the $NO_x$ removal catalyst.

According to a six aspect of the present invention, there is provided the method for suppressing an increase in a $SO_2$ oxidation rate of a $NO_x$ removal catalyst according to the first or second aspect, wherein after washing the $NO_x$ removal catalyst, the $NO_x$ removal catalyst is pulverized and used as a raw material of a $NO_x$ removal catalyst.

According to a seventh aspect of the present invention, there is provided the method for suppressing an increase in a $SO_2$ oxidation rate of a $NO_x$ removal catalyst according to the first or second aspect, wherein after washing the $NO_x$ removal catalyst, a slurry raw material of a $NO_x$ removal catalyst is recoated on a surface of the $NO_x$ removal catalyst.

Advantageous Effects of Invention

According to the present invention, an inhibitor such as a silicon compound that covers the surface of a $NO_x$ removal catalyst can be removed by alkali treatment using an aqueous alkaline solution and activation treatment using an acidic aqueous solution, thereby enabling to provide a catalyst without having an increase in its $SO_2$ oxidation rate of a regenerated $NO_x$ removal catalyst. Furthermore, regeneration of a catalyst and use of the regenerated catalyst contribute to a decrease in industrial waste, which has a large industrial significance in view of environmental issues.

BRIEF DESCRIPTION OF DRAWINGS

FIG. 1 is a drawing with an Si/Ti intensity ratio on the horizontal axis, and a ratio of an actual measurement value to an estimated value (actual measurement value/estimated value) of a $SO_2$ oxidation rate on the vertical axis.

DESCRIPTION OF EMBODIMENTS

The present invention will be described below in detail with reference to the drawing. The present invention is not limited to the example, and when there is a plurality of examples, configurations achieved by combining these examples are also included. In addition, constituent elements in the following examples include those that can be easily anticipated by a person skilled in the art or that are substantially equivalent.

EXAMPLE 1

In the present invention, in a $NO_x$ removal catalyst used for removing nitrogen oxides in flue gas, when a silica component (a silicon compound), which is an inhibitor that increases the $SO_2$ oxidation rate, accumulates on the surface of the catalyst, the silica component accumulating on the surface of the catalyst is dissolved to regenerate the catalyst.

Here, the $NO_x$ removal catalyst to be regenerated by the present invention contains titanium oxide as a main component, and contains vanadium, tungsten, molybdenum or the like as an active component, and specifically includes binary $TiO_2$-$WO_3$ catalyst and $TiO_2$-$MoO_3$ catalyst, ternary $TiO_2$-$V_2O_5$-$WO_3$ catalyst and $TiO_2$-$V_2O_5$-$MoO_3$ catalyst, and the like.

Moreover, a sequence of steps of the regeneration treatment method of the present invention includes an activation treatment step after an alkali treatment step, and appropriately includes an impregnation supporting step of a catalytically active component as required.

Also, a determination step of determining that an inhibitor that increases the $SO_2$ oxidation rate such as a silica component (a silicon compound) is not present in a predetermined amount on the surface of the $NO_x$ removal catalyst is included.

<Alkali Treatment Step>

First, in the alkali treatment step, a $NO_x$ removal catalyst with the performance thereof deteriorated due to accumulation of a silica component on a surface of a $NO_x$ removal catalyst is washed with an aqueous alkaline solution, thereby removing silica as an inhibitor from the $NO_x$ removal catalyst.

The washing method is not particularly limited, and the objective of washing can be achieved by bringing the $NO_x$ removal catalyst into contact with an aqueous alkaline solution.

Specifically, the washing method includes a method of immersing a $NO_x$ removal catalyst in an aqueous alkaline solution, a method of placing a $NO_x$ removal catalyst in a static manner in an aqueous solution of sulfuric acid or an aqueous ammonia solution, a method of generating bubbling air or forced convection in a static $NO_x$ removal catalyst to promote renewing of a solution, and the like.

Also, in the alkali treatment step, an aqueous alkaline solution of a strongly basic material is used, and a solution that produces a sodium compound or a potash compound is preferably used as a solution capable of removing silica.

Specific examples of the aqueous alkaline solution to be used in the present invention include any of aqueous solutions of NaOH, KOH, $Na_2CO_3$, $NaHCO_3$ and $K_2CO_3$, and the like.

Moreover, when the aqueous solution of NaOH, KOH, $Na_2CO_3$, $NaHCO_3$ or $K_2CO_3$ is used as the aqueous alkaline solution, it is generally effective to set alkali concentration in the aqueous solution to a range from 0.05 to 20% by weight, and set the temperature of the aqueous alkaline solution serving as a wash solution to a range from 10 to 90° C.

This is because if the concentration in the aqueous alkaline solution is lower than 0.05% by weight or the temperature of the wash solution is lower than 10° C., washing effect may not be sufficient. In contrast, if the concentration in the aqueous alkaline solution is higher than 20% by weight or the temperature of the wash solution is higher than 90° C., the cost of the treatment facility may increase.

<Activation Treatment Step>

In the activation treatment step, activation treatment is performed by using an acidic aqueous solution, on the $NO_x$ removal catalyst washed in the alkali treatment step described above.

That is, in the alkali treatment step, silica can be removed by washing from the $NO_x$ removal catalyst. However, because an alkaline component used for removing silica by washing remains in the catalyst, the $NO_x$ removal catalyst is poisoned by alkali. Because alkali metal itself is a substance, which may cause deterioration of the $NO_x$ removal catalyst, even if performance deterioration due to accumulation of the silica component (the silicon compound) can be avoided, deterioration due to alkali metal is caused.

Therefore, in the present invention, the activation treatment using an acidic aqueous solution is performed after washing with alkali, thereby removing alkali on the catalyst, and removing all poisonous substances from the $NO_x$ removal catalyst.

Furthermore, in the activation treatment step, it can be considered to use an acidic aqueous solution of an organic or inorganic acid as the acidic aqueous solution. However, it is preferable to use an acidic aqueous solution using an inorganic acid, when a burden on post-treatment and the like is taken into consideration. Both a strong acid and a weak acid can be used, so long as the inorganic acid can be ion-exchanged with sodium or potassium.

Specific examples of the acidic aqueous solution to be used in the present invention include any of aqueous solutions of HCl, HNO$_3$, HF and H$_2$SO$_4$, and the like. Moreover, when the aqueous solution of HCl, HNO$_3$, HF or H$_2$SO$_4$ is used as the acidic aqueous solution, it is generally effective to set the concentration thereof in the aqueous solution to a range from 0.1 to 25% by weight and the temperature of the aqueous solution to a range from 10 to 90° C. This is because if the concentration in the acidic aqueous solution is lower than 0.1% by weight or the temperature of the aqueous solution is lower than 10° C., ion exchange may not be sufficient. In contrast, if the concentration in the acidic aqueous solution is higher than 20% by weight or the temperature of the aqueous solution is higher than 90° C., the cost of the treatment facility may increase.

In the present invention, after performing the alkali treatment step and the activation treatment step, the impregnation supporting step of the catalytically active component described below can be performed to regenerate the NO$_x$ removal catalyst. When the alkali treatment and the activation treatment by an acid are performed, vanadium and tungsten, which are active components of the catalyst, may elute from the catalyst to deteriorate the NO$_x$ removal performance due to a decrease in the concentration of the active component in the catalyst. Therefore, in the present invention, after the silica component (the silicon compound) is removed by washing and the catalyst is washed with water and dried, vanadium and/or tungsten can be impregnated and supported so that the concentration of the active component in the catalyst becomes the same as that of before regeneration. A method of supporting vanadium includes a method of immersing a catalyst in an aqueous solution in which a vanadium compound such as vanadium pentoxide, ammonium metavanadate or vanadyl sulfate is dissolved in water, an organic acid and an amine solution. A method of supporting tungsten includes a method of immersing a catalyst in an aqueous solution in which a tungsten compound such as ammonium paratungstate, ammonium metatungstate, tungsten trioxide or tungsten chloride is dissolved in water, hydrochloric acid, an amine solution and an organic acid.

As described above, according to the regeneration treatment method of the present invention, first, a silica component (a silicon compound) accumulating on the catalyst can be washed in an aqueous alkaline solution in the alkali treatment step, thereby removing the silica component (the silicon compound) accumulating on the surface of the catalyst.

Meanwhile, after this treatment step, Na$^+$ ion may remain on the catalyst. Therefore, in the activation treatment step subsequent to the step, Na$^+$ ion, which may remain on the catalyst and become a poisonous substance to the catalyst, is ion-exchanged by using an acidic aqueous solution such as HCl. Accordingly, Na$^+$ ion is converted to H$^+$ ion, to remove Na$^+$ ion from the catalyst, thereby enabling to recover the activity of the NO$_x$ removal catalyst.

As described above, washing effect of the silica component (the silicon compound) is increased by the alkali treatment by an aqueous alkaline solution and the activation treatment by an acidic aqueous solution. However, elution of vanadium and the like as the active components of the NO$_x$ removal catalyst may be increased, thereby decreasing the concentration of the active components remaining in the catalyst. This means that the NO$_x$ removal performance is not recovered apparently, although the silica component (the silicon compound), which is a substance causing performance deterioration, is removed. Therefore, when elution of the active component in the catalyst is large according to the washing condition, it is effective to recover the catalyst performance by properly impregnating and supporting vanadium (V) and the like of the catalytically active components.

Also, after washing the NO$_x$ removal catalyst, it is effective to pulverize the NO$_x$ removal catalyst and use it as a raw material of a NO$_x$ removal catalyst.

Furthermore, after washing the NO$_x$ removal catalyst, it is also effective to recoat a slurry raw material of a NO$_x$ removal catalyst on the surface of the NO$_x$ removal catalyst.

As described above, according to the present invention, at the time of boiler combustion, when an obstructive factor such as gaseous silica (for example, a silicon compound such as organic silica) present in flue gas in a form of high-temperature steam in unburned fuel covers the surface of the NO$_x$ removal catalyst and regeneration treatment of the NO$_x$ removal catalyst is not performed favorably, an inhibitor such as the silica component (the silicon compound), which covers the surface of the NO$_x$ removal catalyst, can be removed by the alkali treatment by an aqueous alkaline solution and the activation treatment by an acidic aqueous solution, thereby enabling to provide a catalyst with no increase in the SO$_2$ oxidation rate of the regenerated NO$_x$ removal catalyst. In addition, regeneration and reuse of the catalyst contribute to a decrease in industrial waste, which has a significant industrial meaning in view of environmental issues.

<Determination Step>

The determination step is a step of determining that, in the regenerated NO$_x$ removal catalyst, the silica component is not present in a predetermined amount on the surface of the NO$_x$ removal catalyst.

The determination step is a step of measuring an intensity ratio of titanium to silica on the surface of the NO$_x$ removal catalyst. It is preferable to perform the measurement by an electron probe microanalyzer (EPMA).

Also, the intensity ratio can be also measured by X-ray fluorescence analysis (XRF) other than the EPMA.

At the time of measuring titanium and silica (silicon) on the surface of the regenerated NO$_x$ removal catalyst, when glass fibers constituting the catalyst are present, it is preferable to irradiate electron beams to a position where there is no glass fiber to detect generated characteristic X-ray.

Accordingly, the Si/Ti intensity ratio can be determined without being affected by the glass fiber.

Here, at the time of the measurement by the EPMA, it is preferable to measure a plurality of positions on the surface of the regenerated NO$_x$ removal catalyst to obtain a mean value thereof, thereby obtaining the intensity ratio.

The Si/Ti intensity ratio is preferably set to, for example, equal to or lower than 0.1, and more preferably equal to or lower than 0.08.

It is preferable that the ratio is within this range, because a ratio of an actual measurement value to an estimated value (actual measurement value/estimated value) of the SO$_2$ oxidation rate of the NO$_x$ removal catalyst is in a range from 1.00 to 1.30.

This is because when the actual measurement value/estimated value exceeds 1.30, the SO$_2$ oxidation rate is significantly increased, regeneration of the NO$_x$ removal catalyst becomes insufficient, and the NO$_x$ removal catalyst cannot be reused.

Therefore, when the Si/Ti intensity ratio exceeds a predetermined threshold (for example, 0.1), the alkali treatment step and the activation treatment step are performed again to remove silica (the silicon compound), which is an inhibitor that causes an increase in the SO$_2$ oxidation rate, and determination is performed by the determination step to confirm whether the NO$_x$ removal catalyst is reusable.

Accordingly, the catalytically active component such as vanadium (V) is reliably supported on the surface of Ti serving as a carrier, and the catalytic activity becomes favorable.

That is, when the Si/Ti intensity ratio exceeds a predetermined threshold (for example, 0.1), the surface of titanium (Ti) serving as a carrier is covered with the silica component (the silicon compound). In this case, even when vanadium (V) as an active component is supported, the rate of supporting vanadium directly on the surface of titanium is decreased. As a result, the catalytic activity of vanadium is not sufficient, thereby causing an increase in the $SO_2$ oxidation rate.

For example, in the alkali treatment step, regeneration may become insufficient (the Si/Ti intensity ratio is equal to or higher than 0.10) by alkali washing by 1 N-NaOH at 40° C. In this case, it suffices that the washing is performed while raising the alkali washing condition by 1 N-NaOH to 60° C.

As described above, by performing the alkali treatment by an aqueous alkaline solution and the activation treatment by an acidic aqueous solution, and confirming that the Si/Ti intensity ratio does not exceed a predetermined threshold (for example, 0.1), a regenerated $NO_x$ removal catalyst having no increase in the $SO_2$ oxidation rate can be provided with a decreased residual ratio of the inhibitor, which causes an increase in the $SO_2$ oxidation rate, such as the silica component (the silicon compound) that covers the surface of the $NO_x$ removal catalyst.

TEST EXAMPLES

Hereinbelow, the present invention will be described in more detail by test examples. However, the present invention is not limited to these examples at all.

As a used $NO_x$ removal catalyst, a used $NO_x$ removal catalyst (a honeycomb catalyst with 6 holes×7 holes×900 mm) in which silica (a silicon compound) was deposited on a surface of the catalyst was prepared.

Alkali washing and activation treatment were performed by using the used $NO_x$ removal catalyst to perform regeneration treatment.

An Si/Ti intensity ratio on the surface of the regenerated $NO_x$ removal catalyst after the treatment was analyzed by an EPMA.

In the EPMA analysis, electron beams were irradiated, while avoiding glass fibers present on the surface by using an electronic microscope (SEM).

For the EPMA analysis, an X-ray microanalyzer ("XA-8900RL (trade name)" manufactured by JEOL Ltd.) was used.

Test Examples 1 and 2 are a $NO_x$ removal catalyst, for which alkali washing was sufficiently performed, and Comparative Example is a $NO_x$ removal catalyst, for which alkali washing was not sufficient.

Also, an increase in the $SO_2$ oxidation rate was determined by measuring $SO_3$ at an inlet and an outlet of a regenerated $NO_x$ removal catalyst to confirm the increase, and a ratio of an actual measurement value to an estimated value (actual measurement value/estimated value) of the $SO_2$ oxidation rate was obtained from the actual measurement value and the estimated value.

Here, the catalysts used in Test Example 1 are 91.4% by weight of $TiO_2$, 8.0% by weight of $WO_3$, and 0.63% by weight of $V_2O_5$.

Here, the catalysts used in Test Example 2 are 91.4% by weight of $TiO_2$, 8.0% by weight of $WO_3$, and 0.59% by weight of $V_2O_5$.

Here, the catalysts used in Comparative Example are 91.2% by weight of $TiO_2$, 8.0% by weight of $WO_3$, and 0.83% by weight of $V_2O_5$.

FIG. 1 is a drawing with an Si/Ti intensity ratio on the horizontal axis, and a ratio of an actual measurement value to an estimated value (actual measurement value/estimated value) of a $SO_2$ oxidation rate on the vertical axis.

Ratios of the actual measurement value to the estimated value (actual measurement value/estimated value) of the $SO_2$ oxidation rate in Test Examples 1 and 2 and Comparative Example are shown in Table 1.

TABLE 1

|  | Test Example 1 | Test Example 2 | Comparative Example |
|---|---|---|---|
| Estimated value of $SO_2$ oxidation rate | 0.59% | 0.55% | 0.79% |
| Actual measurement value of $SO_2$ oxidation rate | 0.61% | 0.58% | 1.53% |
| Actual measurement value/estimated value | 1.03 | 1.05 | 1.94 |

As illustrated in FIG. 1 and Table 1, the catalyst in Test Example 1 had a Si/Ti intensity ratio of 0.036, and the catalyst in Test Example 2 had a Si/Ti intensity ratio of 0.072, in which each ratio of the actual measurement value to the estimated value of the $SO_2$ oxidation rate was 1.03 and 1.05, respectively, which was lower than 1.3 and close to 1.0, and there was only a slight increase in the $SO_2$ oxidation rate as compared to that of a fresh catalyst.

On the other hand, the Si/Ti intensity ratio of the catalyst in Comparative Example was 0.132, which largely exceeded 0.1. The ratio of the actual measurement value to the estimated value (actual measurement value/estimated value) of the $SO_2$ oxidation rate was 1.94, which exceeded 1.3, and there was a large increase in the $SO_2$ oxidation rate as compared to that of a fresh catalyst.

As a result, it was confirmed that, by setting the Si/Ti intensity ratio equal to or lower than 0.1, the $SO_2$ oxidation rate of the regenerated catalyst does not increase as compared to that of a fresh catalyst.

The invention claimed is:

1. A method for suppressing an increase in a $SO_2$ oxidation rate of a $NO_x$ removal catalyst, comprising:
   an alkali treatment step at which an inhibitor, which causes an increase in a $SO_2$ oxidation rate, is removed by washing with an aqueous alkaline solution, at a time of regeneration of the $NO_x$ removal catalyst; and
   an activation treatment step at which activation treatment of the catalyst is performed with an acidic aqueous solution, after the alkali treatment step, wherein
   a carrier of the $NO_x$ removal catalyst is titanium oxide, and the inhibitor is a silicon compound,
   an intensity ratio of titanium and silicon (Si/Ti intensity ratio) on a surface of the $NO_x$ removal catalyst is obtained, and
   when the Si/Ti intensity ratio exceeds a threshold of 0.1, the alkali treatment step and the activation treatment step are performed again.

2. The method for suppressing an increase in a $SO_2$ oxidation rate of a $NO_x$ removal catalyst according to claim 1, wherein a measurement of the intensity ratio of titanium and silicon is performed by an electron probe microanalyzer (EPMA).

3. The method for suppressing an increase in a $SO_2$ oxidation rate of a $NO_x$ removal catalyst according to claim 1, wherein
the aqueous alkaline solution is an aqueous solution of NaOH, KOH, $Na_2CO_3$, $NaHCO_3$ or $K_2CO_3$, and the acidic aqueous solution is an aqueous solution of HCl, $HNO_3$, HF or $H_2SO_4$.

4. The method for suppressing an increase in a $SO_2$ oxidation rate of a $NO_x$ removal catalyst according to claim 1, wherein
after washing the $NO_x$ removal catalyst, a catalytically active component is impregnated and supported in the $NO_x$ removal catalyst.

5. The method for suppressing an increase in a $SO_2$ oxidation rate of a $NO_x$ removal catalyst according to claim 1, wherein
after washing the $NO_x$ removal catalyst, the $NO_x$ removal catalyst is pulverized and used as a raw material of a $NO_x$ removal catalyst.

6. The method for suppressing an increase in a $SO_2$ oxidation rate of a $NO_x$ removal catalyst according to claim 1, wherein
after washing the $NO_x$ removal catalyst, a slurry raw material of a $NO_x$ removal catalyst is recoated on a surface of the $NO_x$ removal catalyst.

* * * * *